(12) United States Patent
Walker

(10) Patent No.: US 10,039,228 B2
(45) Date of Patent: Aug. 7, 2018

(54) MULTI-SEGMENTED DECK PLATE AUTO ADJUSTMENT MECHANISM FOR A HARVESTER ROW UNIT

(71) Applicant: CNH Industrial America LLC, New Holland, PA (US)

(72) Inventor: Eric Walker, Narvon, PA (US)

(73) Assignee: CNH Industrial America LLC, New Holland, PA (US)

( * ) Notice: Subject to any disclaimer, the term of this patent is extended or adjusted under 35 U.S.C. 154(b) by 29 days.

(21) Appl. No.: 15/157,270

(22) Filed: May 17, 2016

(65) Prior Publication Data
US 2017/0332547 A1 Nov. 23, 2017

(51) Int. Cl.
| | |
|---|---|
| *A01D 45/02* | (2006.01) |
| *A01D 34/00* | (2006.01) |
| *A01D 63/00* | (2006.01) |
| *A01D 101/00* | (2006.01) |

(52) U.S. Cl.
CPC .......... *A01D 34/008* (2013.01); *A01D 45/021* (2013.01); *A01D 63/00* (2013.01); *A01D 2101/00* (2013.01)

(58) Field of Classification Search
CPC .............................. A01D 45/021; A01D 46/28
USPC .............................................. 56/62, 329, 119
See application file for complete search history.

(56) References Cited

U.S. PATENT DOCUMENTS

| | | | | |
|---|---|---|---|---|
| 2,604,749 | A | * | 7/1952 | Fergason ............ A01D 45/025 56/103 |
| 2,663,983 | A | * | 12/1953 | Fergason ............... A01D 45/02 56/111 |
| 2,766,575 | A | * | 10/1956 | Fergason ............ A01D 45/021 56/109 |
| 2,981,045 | A | * | 4/1961 | Blanshine ............ A01D 57/00 56/119 |
| 3,260,041 | A | | 7/1966 | McRoberts et al. |
| 3,339,354 | A | | 9/1967 | Kessler |
| 3,538,694 | A | * | 11/1970 | Holloway ............. A01D 46/28 56/330 |
| 3,613,343 | A | * | 10/1971 | Sagouspe et al. ..... A01D 46/28 56/330 |
| 3,690,054 | A | * | 9/1972 | De Carlo ............... A01D 46/28 56/330 |
| 3,736,734 | A | | 6/1973 | Pavel |
| 3,759,021 | A | | 9/1973 | Schreiner et al. |
| 3,760,574 | A | * | 9/1973 | Tassone ................ A01D 46/28 56/16.5 |
| 3,808,783 | A | | 5/1974 | Sutherland et al. |

(Continued)

*Primary Examiner* — Arpad Fabian-Kovacs
(74) *Attorney, Agent, or Firm* — Patrick M. Sheldrake

(57) ABSTRACT

A row unit for a header of an agricultural harvester is provided. The row unit includes a frame, a first deck plate assembly mounted to the frame, and a second deck plate assembly mounted to the frame. The first and second deck plate assemblies each include a deck plate, a plurality of deck plate segments extending from the deck plate and moveable between a first position and a second position relative to the deck plate, and a plurality of biasing members for biasing each respective deck plate segment. The row unit includes both operator controlled macro adjustment and automatic micro adjustment of a gap between the first deck plate assembly and the second deck plate assembly. The micro adjustment is achieved through biasing members biasing each respective deck plate segment.

20 Claims, 8 Drawing Sheets

(56) References Cited

U.S. PATENT DOCUMENTS

| | | | | |
|---|---|---|---|---|
| 3,866,401 A | * | 2/1975 | Claxton | A01D 46/28 56/330 |
| 3,894,382 A | | 7/1975 | Jauss | |
| 4,130,982 A | * | 12/1978 | Clary | A01D 46/28 56/330 |
| 4,134,251 A | * | 1/1979 | Burton | A01D 46/28 56/330 |
| 4,150,526 A | * | 4/1979 | Burton | A01D 46/28 56/329 |
| 4,327,542 A | | 5/1982 | Van Ginhoven | |
| 4,464,888 A | * | 8/1984 | Burton | A01D 46/28 56/330 |
| 4,750,322 A | * | 6/1988 | Korthuis | A01D 46/28 56/328.1 |
| 5,109,657 A | * | 5/1992 | DeVries | A01D 46/28 56/330 |
| 5,181,373 A | * | 1/1993 | Littau | A01D 46/28 56/329 |
| 5,341,630 A | * | 8/1994 | Littau | A01D 46/28 56/330 |
| 5,355,667 A | * | 10/1994 | Scott | A01D 46/28 56/328.1 |
| 5,495,708 A | * | 3/1996 | Scott | A01D 46/28 56/329 |
| 5,647,194 A | * | 7/1997 | Scott | A01D 46/28 56/328.1 |
| 6,463,725 B1 | * | 10/2002 | Briesemeister | A01D 46/264 56/328.1 |
| 7,818,953 B2 | * | 10/2010 | Pellenc | A01D 46/28 56/10.2 R |
| 8,196,380 B2 | | 6/2012 | Carboni | |
| 8,402,727 B2 | | 3/2013 | Carboni | |
| 8,820,039 B2 | * | 9/2014 | Werning | A01D 41/1273 460/5 |
| 2011/0146218 A1 | * | 6/2011 | Carboni | A01D 45/021 56/62 |
| 2011/0167778 A1 | * | 7/2011 | Sidhu | A01D 46/28 56/329 |
| 2011/0173942 A1 | * | 7/2011 | Kowalchuk | A01D 45/021 56/62 |
| 2012/0029757 A1 | * | 2/2012 | Kowalchuk | A01D 45/021 701/34.2 |
| 2014/0331633 A1 | * | 11/2014 | Vandeven | A01D 45/021 56/62 |
| 2015/0208580 A1 | | 7/2015 | Walker et al. | |
| 2015/0319929 A1 | * | 11/2015 | Hendrickson | A01D 75/00 33/504 |

* cited by examiner

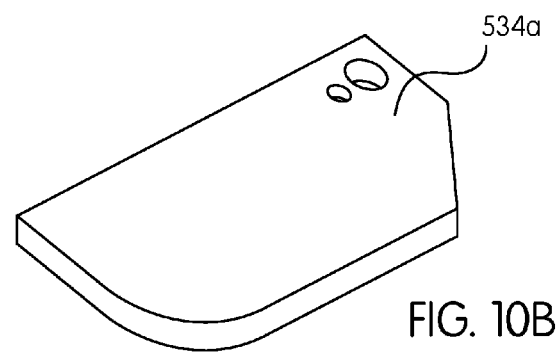
FIG. 10B
FIG. 10A
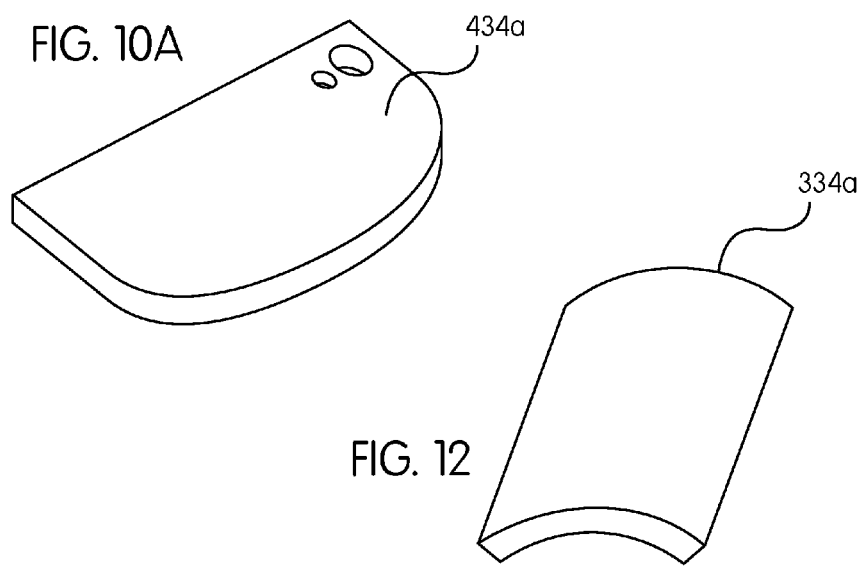
FIG. 12
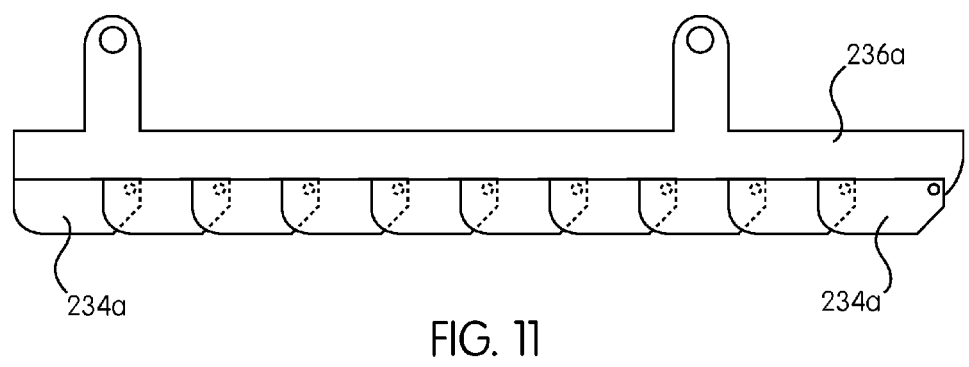
FIG. 11

MULTI-SEGMENTED DECK PLATE AUTO ADJUSTMENT MECHANISM FOR A HARVESTER ROW UNIT

BACKGROUND OF THE INVENTION

The present invention relates generally to corn header assemblies for use with agricultural harvesters. In particular, the present invention relates to an improved corn header assembly that includes a multi-segmented deck plate auto adjustment mechanism.

Agricultural harvesters that harvest corn are provided with headers having dividers, also generally known as snouts, for directing rows of corn stalks to row units that include ear separation chambers which are defined by deck plates or stripping plates that position the ears of corn for separation from the stalks. The ears of corn are then passed to an auger for conveying the corn to a feeder house of the agricultural harvester. Harvested corn is then processed to the harvester's inner chambers for further processing.

Conventional corn header assemblies use e.g., a rock shaft to control the separation or spacing of the deck plates (also referred to as the "gap") within a row unit. Such deck plate separation designs have a rocker arm mounted vertically to the row unit and a control linkage below the row unit to move the deck plates. As a result, adjustment of the deck plate opening from row to row can be difficult, jerky and imprecise. Mechanical tolerances which are built into such a deck plate separation design in order to improve ease of deck plate movement also leads to backlash which affects the operator's ability to properly set the deck plates. Improperly set or poorly adjusted deck plates cause grain loss, ear damage and economic losses. For example, current corn header assemblies utilize a pair of long ridged deck plates and the gap between the deck plates is fixed. As a result, smaller ears of corn may be pulled completely through the fixed gap spacing and go unharvested.

Such deck plate control designs are also bulky, heavy and take up valuable space underneath the corn header row unit. Further, such designs can generate excess debris which can lead to trash accumulation in the corn header assembly effecting overall header efficiency and operation. Debris can also accumulate within the deck plates themselves, including interstitial spaces. In addition, conventional rocker shaft control systems typically control only one of the two deck plates of a single row unit which can lead to the deck plate opening (or gap) not being aligned with the center of the row unit stalk rolls.

During typical harvesting operations, row spacing can vary from approximately fifteen inches to forty inches depending on the number of plants on a given acre. As the row spacing changes, the distance between plants changes. Additionally, the stalk diameter varies from stalk to stalk. Conventional header designs use a moveable non-automatic deck plate design wherein the deck plates are macro controlled by the operator through a hydraulic cylinder and linkage. Another design allows the deck plate to automatically adjust, but results in the deck plates having a gap spacing corresponding to the largest diameter stalk. As such, during harvesting operations, the gap spacing between the deck plates can remain open even when active stalks are not passing through them. Anytime there is no plant, there is a potential for grain loss. As a result, conventional header designs result in significantly more grain loss because grain falls out of deck plates not actively engaged with a row. For example, current fifteen inch headers cannot harvest thirty inch rows because grain can fall out of deck plates not actively engaged with a row.

Therefore, there is still a need for an improved corn header assembly that reduces grain loss and allows harvesting in any direction without losing grain. The present invention addresses the foregoing issues of conventional corn header assemblies.

BRIEF SUMMARY OF THE INVENTION

In accordance with an aspect, the present invention provides a row unit for a header of an agricultural harvester including a frame, a first deck plate assembly mounted to the frame, and a second deck plate assembly mounted to the frame. The first deck plate assembly includes a first deck plate, a plurality of first deck plate segments extending from the first deck plate and moveable between a first position and a second position relative to the first deck plate, and a plurality of biasing members for biasing each respective first deck plate segment. The second deck plate assembly includes a second deck plate, a plurality of second deck plate segments extending from the second deck plate and moveable between a first position and a second position relative to the second deck plate, and a plurality of biasing members for biasing each respective second deck plate segment.

In accordance with another aspect, the present invention provides a row unit for a header of an agricultural harvester including a first deck plate assembly and a second deck plate assembly adjacently mounted on a frame. Each deck plate assembly includes a deck plate, a plurality of deck plate segments mounted to the deck plate, and a plurality of biasing members for biasing the plurality of deck plate segments.

In accordance with yet another aspect, the present invention provides a deck plate assembly for an agricultural harvester including a deck plate, a plurality of deck plate segments mounted to the deck plate and moveable between a first position and a second position relative to the deck plate, and a plurality of biasing members for biasing each respective deck plate segment.

In accordance with another aspect, the present invention provides a frame, a plurality of deck plate segments mounted to the frame and moveable between a first position and a second position relative to the frame, and a plurality of biasing members for biasing each respective deck plate segment.

The present invention provides a multi-segmented deck plate auto adjustment mechanism with operator control of macro adjustment for a corn header. Essentially there are a multitude of small moveable deck plate segments mounted to a longer moveable deck plate. There are both left header and right header deck plates. The deck plates work in unison to ensure that the deck plate opening remains centered. The small segments are spring controlled so that when a corn stalk engages the segment, the segment opens allowing the stalk to enter between the deck plates. The segments have a fixed range that allows for a predetermined maximum opening based on the position of the long supporting deck plate. The segmented deck plate allows for the deck plate to be set to a zero clearance without excessive opening force. The zero clearance will allow the deck plates to be used on rows that do not have active stalks passing through them. The zero clearance allows the deck plates to remain closed except when a stalk is present. Therefore, there can be no grain loss through the deck plates when in the closed position. Thus, with the deck plate opening sealed off or closed, row unit spacing narrower than the planted row spacing can be used without the fear of losing grain. For example, a fifteen inch spacing head can be used to harvest thirty inch rows or across rows without grain loss through unused row units.

Conventional corn header designs use a moveable non-automatic deck plate design. The deck plates are controlled by the operator through a hydraulic cylinder and linkage. One design uses a spring loaded cylinder to "automatically" adjust the deck plates, but has no way to change or control the pressure opening i.e., adjust the opening to the diameter of each individual stalk. When deck plates are not adjusted properly, ears and loose grain can drop between the deck plates and become lost. When crop is stressed due to drought or flooding, the stalk diameter can change greatly from stalk to stalk. Also, ear diameter can vary widely under stress conditions. Small diameter ears are easily pulled through the gap in the deck plates. The long deck plate is macro controlled by the machine or machine operator. The macro control has a range of adjustment from zero to an engineering determined maximum, such as one hundred millimeters. The segments could have smaller allowable distance of travel, such as seventeen millimeters, allowing the segments to be operated in all crop conditions. Current heads and row units cannot harvest across rows because grain can fall out of the deck plates. Current fifteen inch heads cannot harvest thirty inch rows because grain will fall out of the deck plates that are not actively engaged with a row.

Current designs use a pair of long ridged deck plates. Generally, one is bolted in a fixed position and the other is adjusted by a hydraulic cylinder and linkage. The present invention could use a pair of ridged deck plates controlled by a linkage and a multitude of small spring loaded deck plate segments. The spring loaded deck plate segments could be adjusted with a gap as are traditional deck plates or set to zero clearance so that no grain is lost between the deck plates.

The deck plate works by having a pair of deck plates that can be adjusted to achieve a given opening and to allow clean out. Thus, there would be the ability to provide an operator input for the macro opening. The small segments could be spring loaded with a spring force great enough to provide a fairly ridged deck plate but light enough so that the stalk can cause the deck plate to retract to create an opening that matches the diameter of the stalk. As such, the deck plate opening adjusts to the diameter of each individual stalk. The arrangement also allows for the deck plates to be in a completely closed position when a stalk is not in between the deck plate segments. Thus, grain loss will be reduced.

The resultant advantages of the present invention include meeting customer demand for lower grain loss and adding grain saving value to the corn head. The present invention also brings product differentiation to the row unit and moves the technology of harvesting forward. The present invention allows for the development of a corn head that can harvest in any direction without losing grain.

In sum, the present invention provides a multi-segmented deck plate and has the ability to close off the row unit opening completely except for where stalk is present. The present invention includes spring or elastomer tensioned segments and provides a combination of floating segments and allows macro adjustment of the whole deck plate. Such a multi-segmented deck plate allows for the development of a corn header that can harvest in any direction while minimizing grain loss.

BRIEF DESCRIPTION OF THE SEVERAL VIEWS OF THE DRAWINGS

The foregoing summary, as well as the following detailed description of the several aspects of the present invention, will be better understood when read in conjunction with the appended drawings. For the purpose of illustrating the present invention, there are shown in the drawings several aspects, but it should be understood that the present invention is not limited to the precise arrangements and instrumentalities shown.

In the drawings:

FIGS. 10A-B are top perspective views of various embodiments of deck plate segments applicable to the deck plate assembly of the row unit of FIG. 2;

FIG. 11 is a simplified top plan view of a select portion of the deck plate assembly of FIG. 5; and FIG. 12 is a top perspective view of yet another embodiment of a deck plate segment applicable to the deck plate assembly of the row unit of FIG. 2.

DETAILED DESCRIPTION OF THE INVENTION

Figure 1:
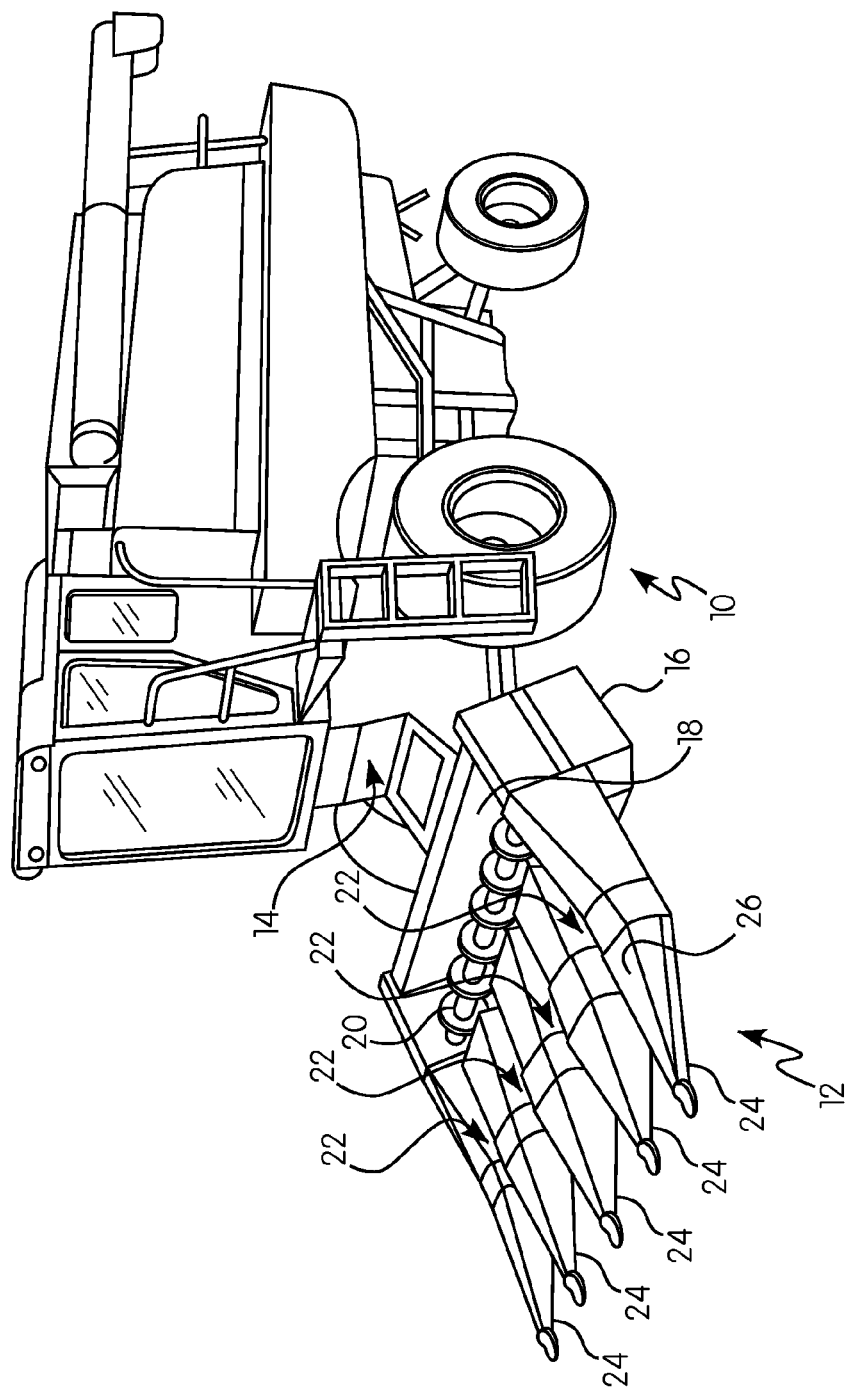
FIG. 1 is a perspective view of an agricultural harvester including a corn header in accordance with an aspect of the present invention.

Reference will now be made in detail to the various aspects of the present invention illustrated in the accompanying drawings. Wherever possible, the same or like reference numbers will be used throughout the drawings to refer to the same or like features. It should be noted that the drawings are in simplified form and are not drawn to precise scale. In reference to the disclosure herein, for purposes of convenience and clarity only, directional terms such as top, bottom, left, right, above, below and diagonal, are used with respect to the accompanying drawings. Such directional terms used in conjunction with the following description of the drawings should not be construed to limit the scope of the present invention in any manner not explicitly set forth.

Certain terminology is used in the following description for convenience only and is not limiting. The words "right,"

"left," "lower" and "upper" designate directions in the drawings to which reference is made. The words "inwardly" and "outwardly" refer to directions toward and away from, respectively, the geometric center of the identified element and designated parts thereof. Additionally, the term "a," as used in the specification, means "at least one." The terminology includes the words above specifically mentioned, derivatives thereof, and words of similar import.

"About" as used herein when referring to a measurable value such as an amount, a temporal duration, and the like, is meant to encompass variations of ±20%, ±10%, ±5%, ±1%, or ±0.1% from the specified value, as such variations are appropriate.

The terms "corn," "ear," "stalk," and "crop material" are used throughout the specification for convenience and it should be understood that these terms are not intended to be limiting. Thus, "corn" refers to that part of a crop which is harvested and separated from discardable portions of the crop material. The term "deck plate" is used interchangeably with the term "stripping plate."

Throughout this disclosure, various aspects of the present invention can be presented in a range format. It should be understood that the description in range format is merely for convenience and brevity and should not be construed as an inflexible limitation on the scope of the present invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 2.7, 3, 4, 5, 5.3, and 6. This applies regardless of the breadth of the range.

Furthermore, the described features, advantages and characteristics of the embodiments of the present invention may be combined in any suitable manner in one or more embodiments. One skilled in the relevant art will recognize, in light of the description herein, that the present invention can be practiced without one or more of the specific features or advantages of a particular embodiment. In other instances, additional features and advantages may be recognized in certain embodiments that may not be present in all embodiments of the present invention.

Referring now to the drawings wherein aspects of a preferred embodiment of the present invention are shown, FIG. 1 illustrates a corn header assembly 12 as applied to agricultural harvester 10. The corn header assembly 12 is an improvement to current conventional corn header assemblies by incorporating a row unit 22 having a multi-segmented deck plate system that can allow for more efficient adjustment of the deck plate opening to respond to variations in corn stalk width by way of a simple, compact design. In particular, the row unit 22 incorporates both a macro control of the deck plate opening and an automatic micro adjustment of the deck plate opening. The row unit 22 is operatively connected to the agricultural harvester 10 for harvesting corn and feeding the corn to a feeder house 14 for receiving crop residue, cutting, chopping and propelling the residue rearwardly and outwardly from the agricultural harvester 10 while retaining the valuable corn ears and kernels. Such feeder houses and harvesting operations are known in the art and a further detailed description of their structure, function and operation is not necessary for a complete understanding of the present embodiment. However, typical feeder houses and harvesting operations applicable to the present invention are disclosed in U.S. Pat. Nos. 3,808,783 and 3,759,021, the entire disclosures of which are incorporated by reference herein for all purposes.

The corn header assembly 12 includes header frame 16 for mounting to a forward end of the agricultural harvester 10, a conveyor 20 (such as an auger) extending lengthwise across the header frame 16 for conveying crop material to the combine feeding location or feeder house 14 through channel 18 and a plurality of row units 22 extending forwardly from the header frame. The corn header assembly 12 further includes a plurality of dividers 24 extending forward from the header frame 16. Such dividers 24 are known in the art and a further detailed description of their structure, function and operation is not necessary for a complete understanding of the present invention.

Figure 2:
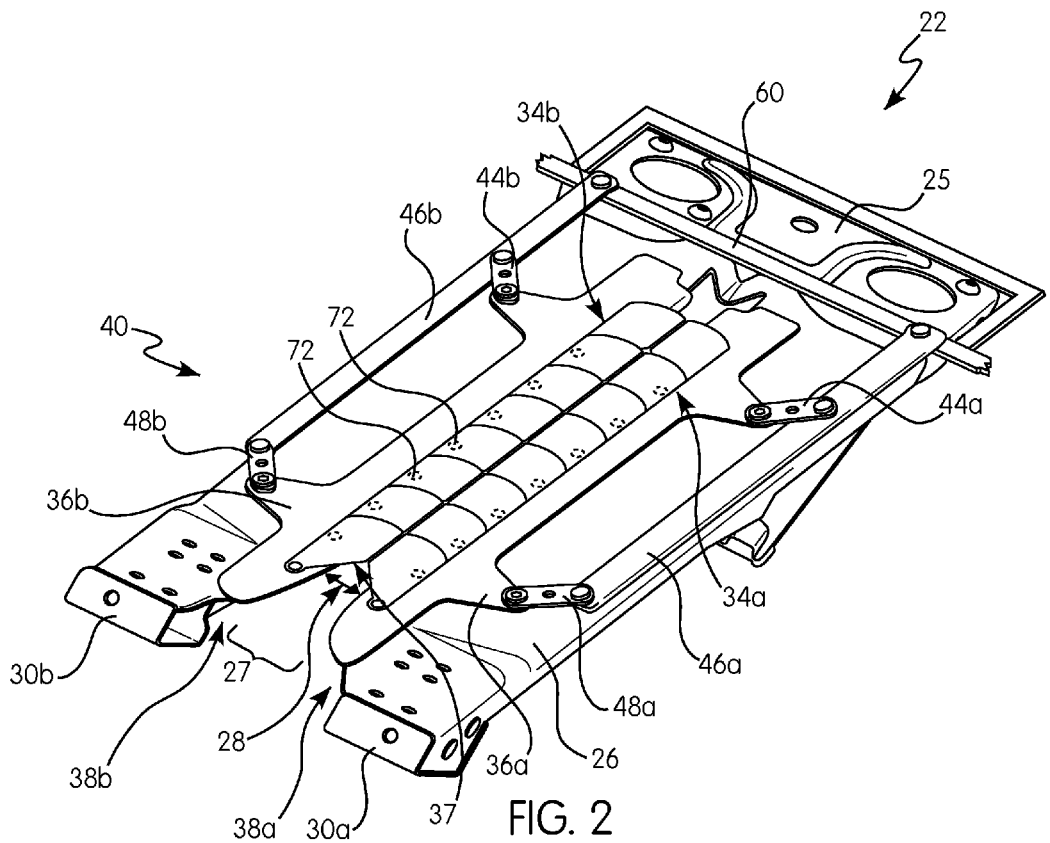
FIG. 2 is a top perspective view of a select portion of a row unit of the corn header of FIG. 1.

FIG. 2 shows a top perspective view of select components of a single row unit 22 in accordance with an aspect of the present invention. The row unit 22 includes a frame 26 forming two row unit arms 30a, 30b, a first deck plate assembly 38a mounted to the frame 26, and a second deck plate assembly 38b mounted to the frame 26. The first deck plate assembly 38a includes a first deck plate 36a, a plurality of first deck plate segments 34a extending from the first deck plate 36a and moveable between a first position (FIG. 2) and a second position (FIG. 4) relative to the first deck plate 36a, and a plurality of biasing members 50 (FIGS. 6-9) for biasing each respective first deck plate segment 34a. Likewise, the second deck plate assembly 38b includes a second deck plate 36b, a plurality of second deck plate segments 34b extending from the second deck plate 36b and moveable between a first position and a second position relative to the second deck plate 36b, and a plurality of biasing members 50 for biasing each respective second deck plate segment 34b.

As shown in FIG. 2, the first and second stripping plates or deck plates 36a, 36b define a gap 28 therebetween and an open forward end 27 through which stalks are customarily received by the row unit 22. That is, the open forward end is not covered by any deck plate segments. Breast plate 25 defines the closed end region of the gap 28 and is positioned at an end of the row unit 22 closest to the agricultural harvester 10, i.e., a proximal end of the row unit 22. FIG. 2 shows the plurality of deck plate segments 34a, 34b in a closed position wherein a width of the gap 28 is completely covered by the plurality of deck plate segments, thereby forming a zero clearance between the plurality of deck plate segments 34a, 34b. The gap 28 can be configured to have a fixed width throughout the entire length of the row unit 22, or the design of the row unit 22 can allow the gap at the front of the deck plates 36a, 36b (that is the end of the deck plates through which corn enters the row unit) to have a different width than the width of the gap at the rear of the deck plate 36a, 36b e.g., wider towards the front and narrower towards the rear.

In accordance with an aspect of the present invention, the row unit 22 includes a gap adjustment mechanism 40 for adjusting a size or width of the gap 28 between the respective deck plates 36a, 36b. The gap adjustment mechanism 40 includes a first elongated linkage 46a extending in a lengthwise direction of the first longitudinally extending deck plate 36a, a first primary connection mechanism 44a connecting the first deck plate 36a and the first elongated linkage 46a about a first end of the first deck plate 36a, and a first secondary connection mechanism 48a connecting the first deck plate 36a and the first elongated linkage 46a about a second end of the first deck plate 36a. The gap adjustment mechanism 40 can also include a second elongated linkage 46b extending in a lengthwise direction of the second longitudinally extending deck plate 36b, a second primary connection mechanism 44b connecting the second deck plate 36b and the second elongated linkage 46b about a first end of the second deck plate 36b, and a second secondary connection mechanism 48b connecting the second deck plate 36b and the second elongated linkage 46b about a second end of the second deck plate 36b. The first and second elongated linkages 46a, 46b are connected to a control arm 60 for adjusting the width of the gap 28 (also known as a stalk receiving gap) defined by the first and second deck plates 36a, 36b.

The control arm or crosslink 60 is operatively connected to the first and second elongated linkages 46a, 46b, for moving the first and second deck plates 36a, 36b to predetermined positions. The elongated linkages 46a, 46b can be positioned substantially transverse or perpendicular to the control arm 60. Adjustment via the control arm 60 to predetermined positions and the resulting width of the gap 28 between the deck plates 36a, 36b constitutes a macro or coarse adjustment of the row unit.

In an aspect of the present invention, the control arm 60 is operatively connected to a drive or other mechanism for changing its position, for example a motor (not shown) which is changed manually and/or remotely by an operator. In a further aspect of the present invention, the same control arm 60 can extend across an entire width of the header connecting the linkage assemblies from all of the plurality of row units on the corn header assembly.

Each of the primary and secondary connection mechanisms 44a, 44b, 48a, 48b may be a bell crank, a rotating cam, a linkage assembly or a pivot mechanism. The connection mechanisms 44a, 44b, 48a, 48b are configured as shaped and best shown in FIG. 2 as a pivot mechanism. Specifically, each connection mechanism 44a, 44b, 48a, 48b is a pivot mechanism connected to respective elongated linkages 46a, 46b and deck plate assemblies 38a, 38b, and pivotably connected to the row unit 22. Each of these connection mechanisms can include a central aperture for connecting to the row unit frame 26 and a pair of spaced apart apertures for connecting to the respective elongated linkages 46a, 46b and respective deck plates 36a, 36b. For example, first primary connection mechanism 44a is mounted to the row unit frame 26 and pivotably connected to both the first deck plate 36a and first elongated linkage 46a about a first end of the first deck plate 36a. Second primary connection mechanism 44b is similar to the first primary connection mechanism 44a. As such, second primary connection mechanism 44b is mounted to the row unit frame 26 and pivotably connected to both the second deck plate 36b and second elongated linkage 46b about a first end of the second deck plate 36b. Additionally, first secondary connection mechanism 48a is mounted to the row unit frame 26 and pivotably connected to both the first deck plate 36a and first elongated linkage 46a about a second end of the first deck plate 36a. Second secondary connection mechanism 48b can be a mirror image of first secondary connection mechanism 48a.

In each configuration, movement of the elongated linkages 46a, 46b by the control arm 60 also moves the primary connection mechanisms 44a, 44b and secondary connection mechanisms 48a, 48b. In other words, the first and second deck plate assemblies 38a, 38b can be positionally adjusted via a connection to the control arm 60.

In accordance with another aspect of the present invention, the first and second elongated linkages 46a, 46b move in parallel motion with the first and second deck plate assemblies 38a, 38b, respectively. This is achieved by configuring the spacing between the elongated linkage and the deck plate assemblies 38a, 38b via the connection mechanisms, e.g., connection mechanisms 44a, 44b, 48a, 48b, to be the same throughout their respective range of motions. In an aspect, the elongated linkages 46a, 46b and connection mechanisms 44a, 44b, 48a, 48b of the gap adjustment mechanism 40 are configured with generally planar profiles as shown, e.g., in FIG. 2. Moreover, the elongated linkages and connection mechanisms are positioned such that they are adjacent a lateral side of the deck plate assemblies 38a, 38b. In this configuration, the elongated linkages 46a, 46b and connection mechanisms are all positioned above a top surface of the row unit frame 26. As such, the gap adjustment mechanism allows the entire mechanism to lay substantially within or adjacent a plane defined by the deck plate assemblies, thereby reducing the amount of space necessary for installation on the row units and to facilitate spacing of the row units.

Figure 3:
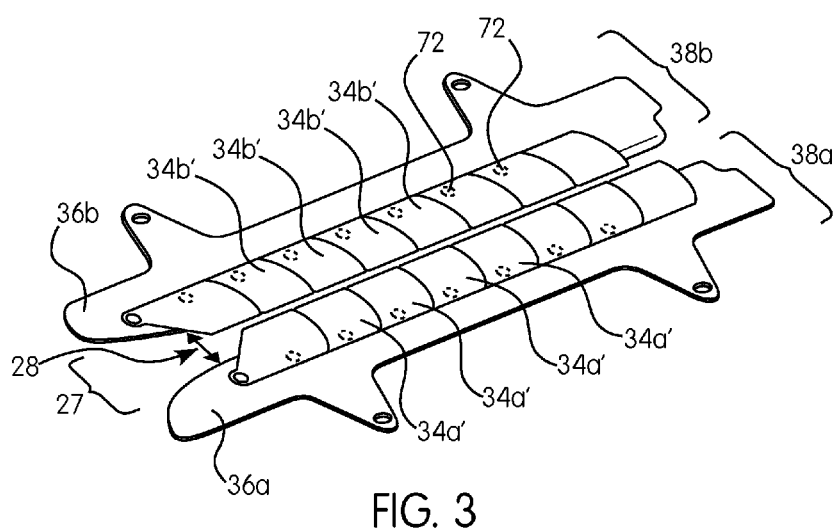
FIG. 3 is a top perspective view of a deck plate assembly of the row unit of FIG. 2 with certain components omitted in accordance with another aspect.

In accordance with an aspect of the present invention, the first deck plate assembly 38a may be positioned at an angle other than parallel with respect to the second deck plate assembly 38b. In such an aspect a relative angle between the first and second deck plate assemblies 38a, 38b may be fixed at assembly of the row unit 22 or may be adjustable by an operator. As shown in FIG. 2, the respective first and second deck plate segments 34a, 34b can be positioned so that internal edges of opposing pairs of deck plate segments 34a, 34b are aligned i.e., in parallel alignment by a macro adjustment of the deck plates 36a, 36b by an operator. In this configuration, each first deck plate segment 34a is in parallel alignment with a corresponding second deck plate segment 34b. Alternatively, as shown in FIG. 3, the respective first and second deck plate segments 34a', 34b' can be positioned in a staggered or spaced apart alignment.

Each of the plurality of first and plurality of second deck plate segments 34a, 34b can be configured as shown e.g., in FIG. 2 as a substantially planar body extending inwardly from the respective first and second deck plates 36a, 36b. For example, the plurality of second deck plate segments 34b extend from the second deck plate 36b toward a medial direction of the row unit 22. Preferably, each of the plurality of first and plurality of second deck plate segments 34a, 34b have a tapered leading edge 37 forming a wedge shaped front end which engages stalks entering the row unit. As further discussed below, each of the plurality of deck plate segments pivot about a respective pivot pin 72 connected to a respective deck plate 36a, 36b when retracting to create a clearance opening 29 (FIG. 4) for a stalk to pass through the gap 28 and when returning to their original closed position. Preferably, the plurality of deck plate segments are positioned to have a zero clearance opening when stalk is not present to cover the gap 28.

Figure 4:
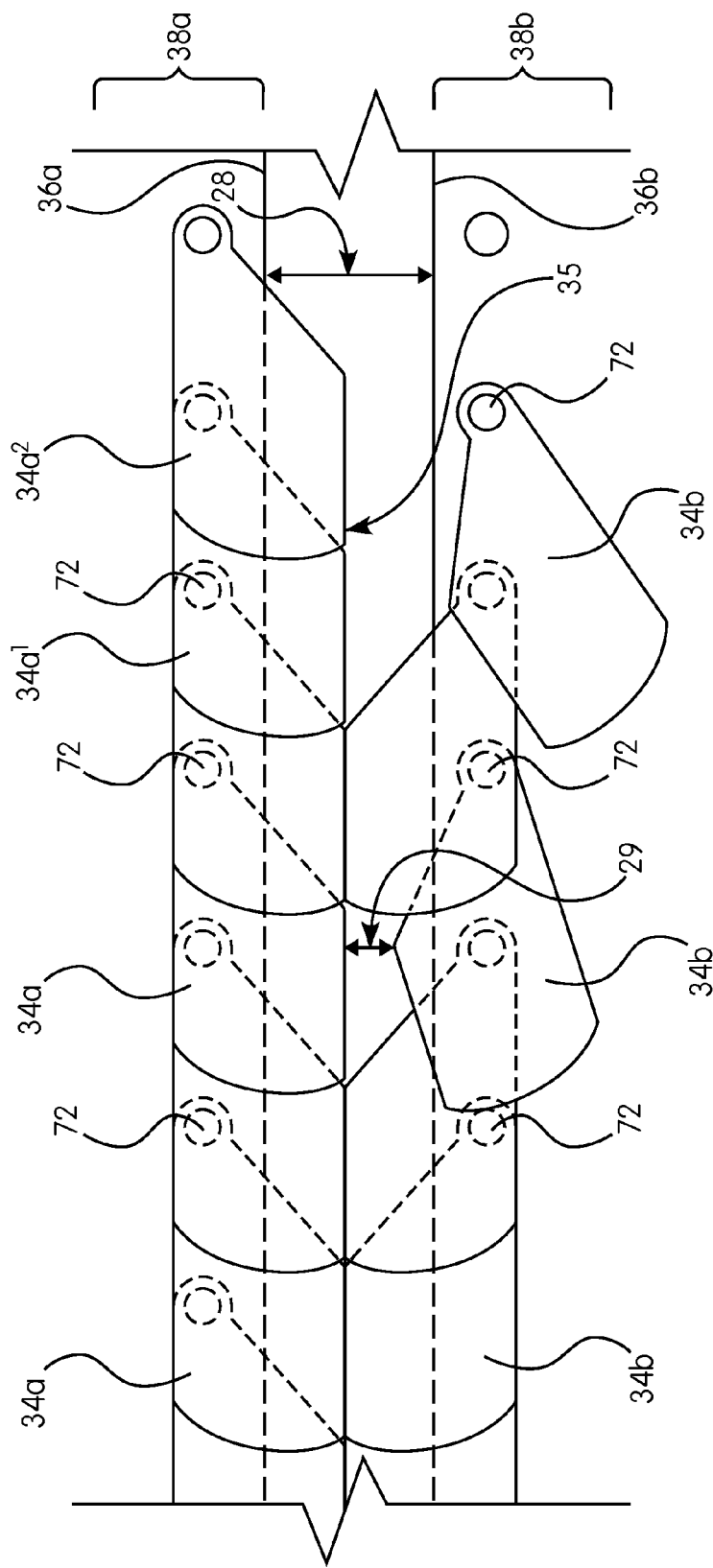
FIG. 4 is a top plan view of a deck plate assembly of the row unit of FIG. 2.

In accordance with an aspect of the present invention shown in FIG. 4, each of the plurality of deck plate segments 34a, 34b is configured as a substantially planar deck plate segment that overlaps an adjacent deck plate segment 34a, 34b. For example, first deck plate segments $34a^2$ overlaps adjacent first deck plate segment $34a^1$. This can be accomplished, for example, by a relief cut out built into the individual deck plates for clearance or a spacing between respective planes of adjacent deck plates. The overlap of adjacent deck plates allows for a continuous effective stripping edge 35 to be established.

The deck plate segments 34a, 34b are positioned such that the gap 28 is covered when set to a zero clearance position. As such, the clearance opening 29 between deck plate segments 34a, 34b remains closed when no stalks are present. Generally, the deck plates work in unison to ensure that the gap 28 remains centered. Each deck plate segment is spring controlled such that when a corn stalk engages a respective deck plate segment 34a, 34b, the deck plate segment opens to allow the corn stalk to enter the gap 28 between the deck plates. Preferably, each deck plate segment is biased with a biasing force sufficient to provide a rigid deck plate assembly but also to allow corn stalk to cause each respective deck plate segment to retract to create the clearance opening 29 that matches an overall diameter of the corn stalk.

In operation, as stalk enters the gap 28, the stalk engages respective deck plate segments 34a, 34b causing individual or a pair of opposing deck plate segments to bias towards the retracted position creating the clearance opening 29 for the stalk to pass through the section of the plurality of deck plate segments. Owing to the biasing member biasing respective deck plate segments toward the closed position, the clearance opening 29 adjusts to the diameter of each individual stalk. Ears of corn are then stripped from the stalks by the deck plate segments 34a, 34b as they are pulled downwardly by the stalk rolls. The original or closed position between the deck plate segments 34a, 34b can be set to a predetermined position e.g., set to a zero clearance spacing i.e., to completely cover the gap 28 as shown in FIG. 4.

Figure 4A:
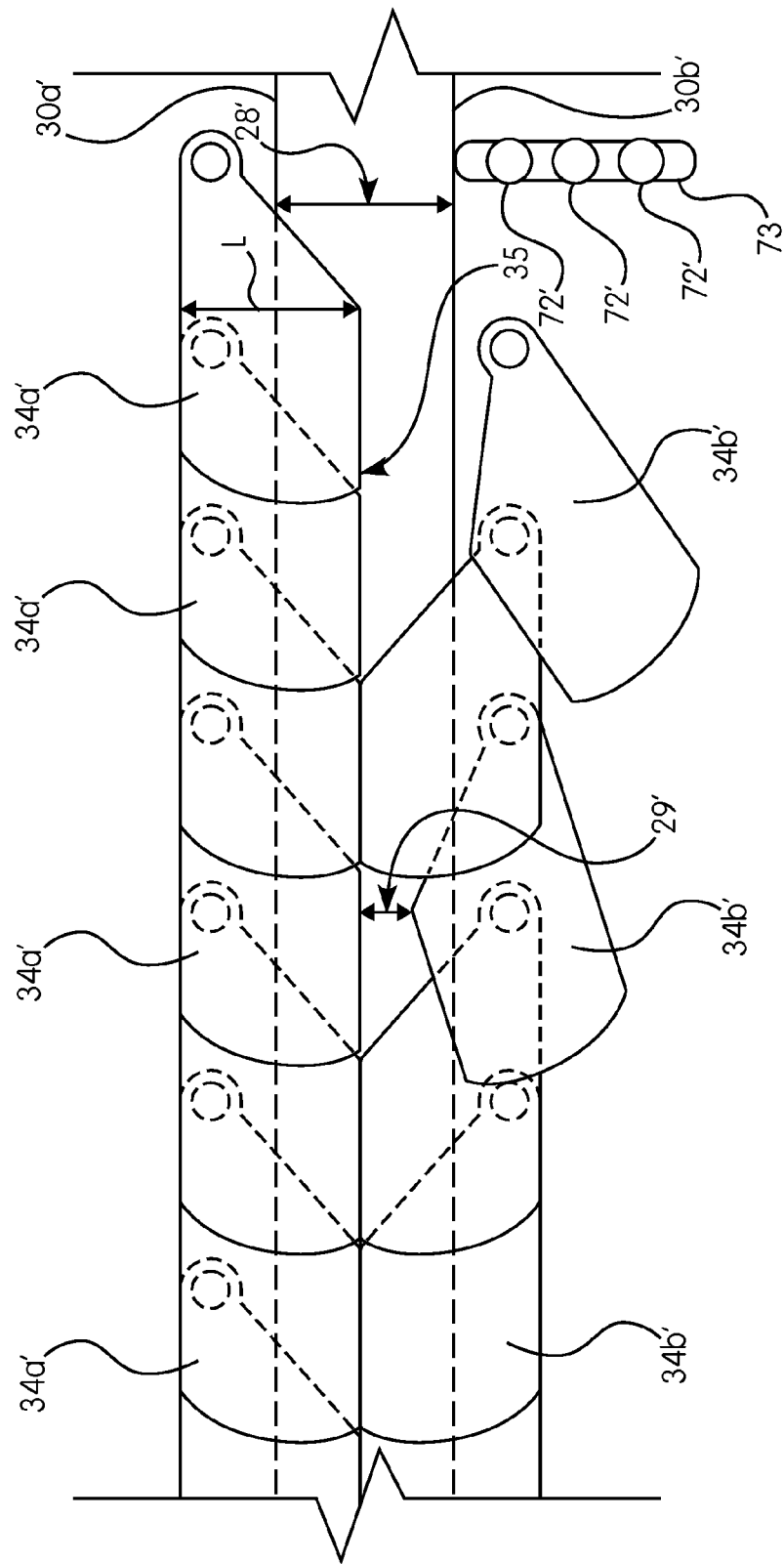
FIG. 4A is a top plan view of a select portion of a row unit of the corn header of FIG. 1 in accordance with another aspect of the present invention.

Referring to FIG. 4A, in accordance with another embodiment of the present invention, each of the plurality of deck plate segments 34a', 34b' is directly mounted to and supported by the two row unit arms 30a', 30b' of the row unit frame 26. For example, a first plurality of deck plate segments 34a' is mounted to row unit arm 30a' and moveable between a first position and a second position relative to row unit arm 30a'. Likewise, a second plurality of deck plate segments 34b' is mounted to row unit arm 30b' and moveable between a first position and a second position relative to row unit arm 30b'. The row unit also includes a plurality of biasing members for biasing each respective deck plate segment 34a', 34b'.

In this configuration, a gap 28' between the row unit arms 30a', 30b' is fixed. Thus, the attachment of the plurality of deck plate segments can be adjusted in the lateral direction e.g., by inclusion of a series of attachment points 72' along slot 73. Specifically, each of the plurality of deck plate segments 34a', 34b' can be slidably attached at particular attachment points 72' along slot 73 in order to adjust a clearance opening 29' between each of the respective plurality of deck plate segments 34a', 34b'. Additionally, deck plate segments 34a', 34b' of varying widths L can be used to further adjust the clearance opening 29' between each of the respective plurality of deck plate segments 34a', 34b'. For example, deck plate segments 34a', 34b' can have a width L such that the gap 28' between the row unit arms 30a', 30b' is completely covered.

Adjustment via positioning each of the plurality of deck plate segments 34a', 34b' along the series of attachment points 72' and the use of deck plate segments 34a', 34b' of varying widths L constitutes a macro adjustment of the clearance opening 29'. Similar to deck plate segments 34a, 34b, the plurality of deck plate segments 34a', 34b' and their respective biasing members provide an automatic micro adjustment of the clearance opening 29' to accommodate multiple stalks of varying widths passing through the gap 28' between the row unit arms 30a', 30b'. Each of the plurality of deck plate segments 34a', 34b' are preferably attached to their respective row unit arms 30a', 30b' similar to how deck plate segments 34a, 34b are attached to their respective deck plates 36a, 36b, as discussed above.

Figure 5:
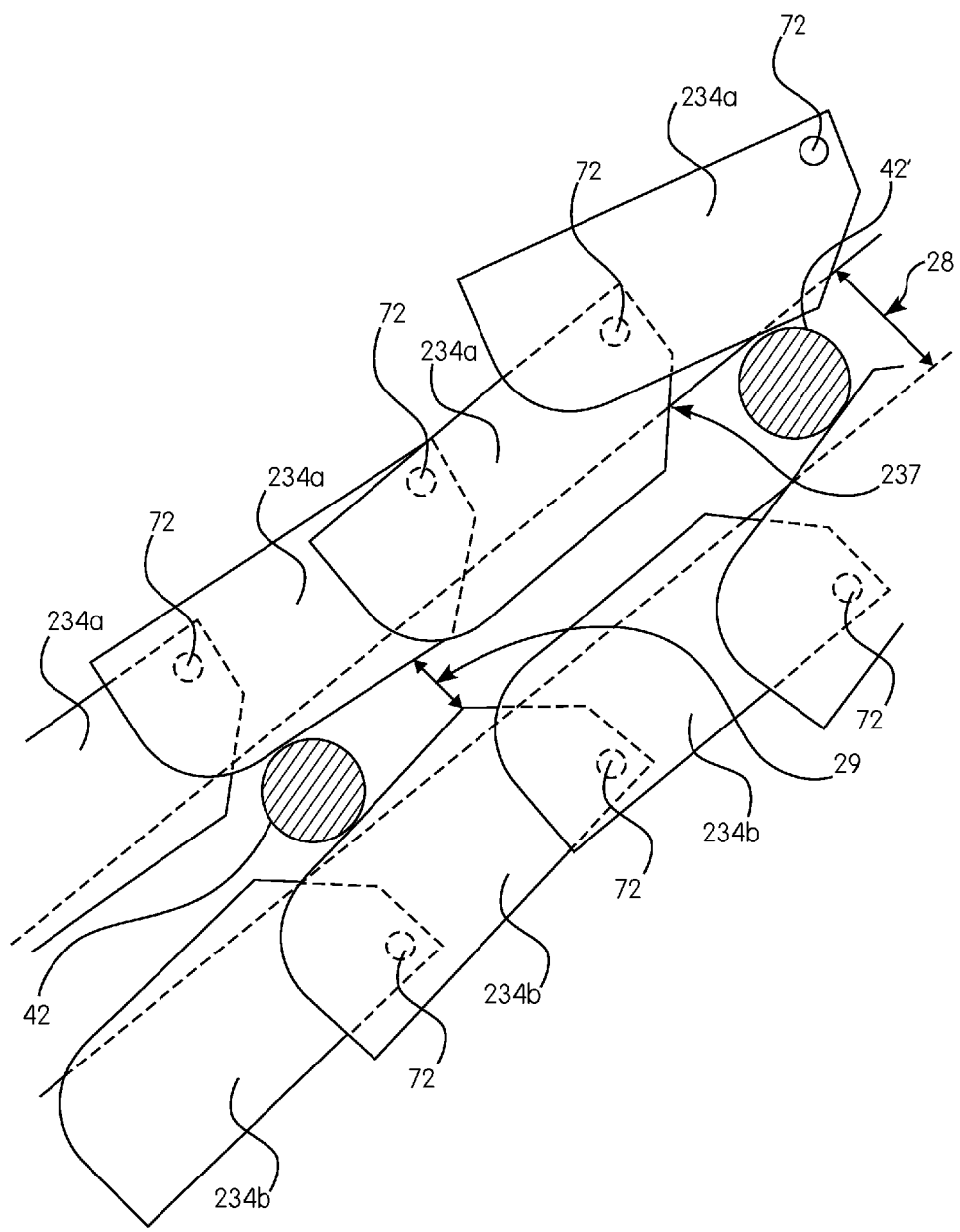
FIG. 5 is a top plan view of a deck plate assembly in accordance with another aspect of the present invention.

FIG. 5 shows an alternate configuration of deck plate segments applicable to the present invention. The plurality of deck plate segments 234a, 234b are shaped similar to the plurality of deck plate segments 34a, 34b shown in FIG. 4 but with a differently shaped tapered and leading edge 237. Similar to deck plate segments 34a, 34b, each of the deck plate segments 234a, 234b can open to varying widths for accommodating multiple stalk 42, 42' widths. The overall longitudinal length of a deck plate segment is longer than deck plate segment 34a, i.e., an elongated deck plate segment. The tail end of the deck plate segment is also configured with a linear edge. FIG. 11 provides a simplified top plan view of deck plate segments 234a.

In yet another aspect, each of the plurality of first and second deck plate segments can be a curved deck plate segment 334a defining convex stalk engaging surfaces (FIG. 12). An opposing deck plate segment would be a mirror image of 334a. The curved deck plate segments can be configured to be complementary in shape to an overall circumferential shape of stalk stripping rolls positioned below the deck plate segments. Typically, stalk rolls are disposed beneath the deck plate segments and are cooperatively rotated to pull the corn stalks downwardly into stalk receiving slots where ears of the corn stalk come into contact with the deck plate segments and are snapped off of the stalks by the deck plate segments. The deck plate segments lie generally tangent to the upper surfaces of the stalk rolls and the stalk rolls engage the corn stalks at "pinch points" situated below the upper surface of the deck plate segment. The greater the distance between the pinch points on the stalk rolls and the upper surfaces of the deck plate segments the greater the pulling force required to snap the corn ears from the stalks. As the pulling forces increase, damage to the ears of the corn stalk is more likely to occur as they are stripped from the corn stalks. The curved deck plate segments reduce the distance between the upper surfaces of the deck plate segments and the "pinch points." As a result, less force is required to snap a corn ear from a corn stalk thereby reducing the possibility of damage to the ears of the corn stalk.

FIGS. 10A and 10B show additional configurations of deck plate segments 434a, 534a applicable to the present invention. Specifically, the thickness of the edge of the deck plate segments shown in FIGS. 10A and 10B reduces pressure on plant stalks entering the row unit, thereby avoiding unnecessary cutting of the plant stalks during regular harvesting operations.

Figure 6:
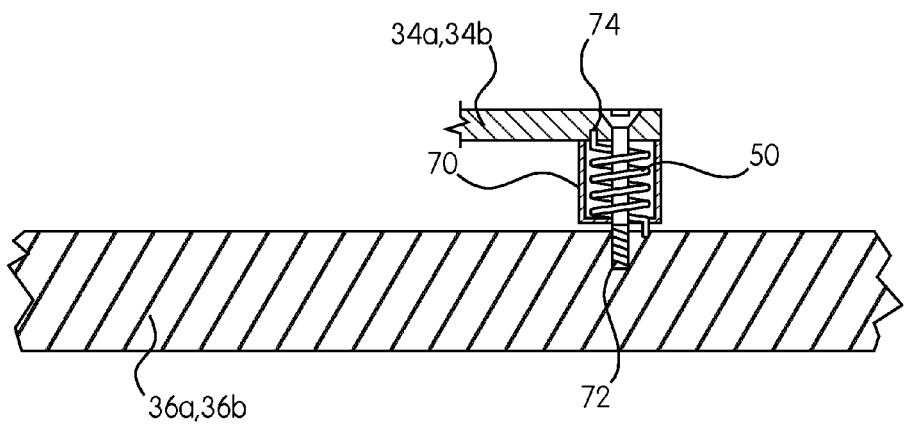
FIG. 6 is a partial simplified side cross-sectional view of a biasing member of a deck plate assembly of the row unit of FIG. 2.

Referring now to FIG. 6, the first deck plate assembly 38a and second deck plate assembly 38b include a plurality of biasing members 50 for biasing respective deck plate segments 34a, 34b. Specifically, as discussed above, stalk enters the gap 28 and engages respective deck plate segments 34a, 34b causing individual or a pair of deck plate segments to bias towards the retracted position creating the clearance opening 29 for the stalk to pass through a section of the plurality of deck plate segments. Owing to the biasing member biasing respective deck plate segments toward the closed position, the clearance opening 29 adjusts to the diameter of each individual stalk passing through the gap 28.

Each of the biasing members 50 can be a torsion spring, a tension spring, a compression spring, an elastomeric member, or combination thereof. Specifically, an individual biasing member 50 is operably connected to each of the plurality of deck plate segments 34a, 34b for biasing the respective deck plate segments towards engagement with stalks of varying thicknesses when the deck plate segments 34a, 34b are biased outwardly by the stalk 42. That is, owing to each biasing member 50, a pair of opposing deck plate segments 34a, 34b is configured to widen so as to receive stalks 42 through the gap 28 when the deck plate segments 34a, 34b are at a predetermined micro adjusted position or zero clearance position. As the stalks cause the deck plate segments to bias toward the retracted position, the biasing members 50 apply a bias to each of the plurality of deck plate segments 34a, 34b for urging the deck plate segments 34a, 34b to continuously engage the stalk 42 regardless of its width or varying widths of a plurality of stalks passing through the gap 28.

In accordance with an aspect, the biasing member 50 is configured as best shown in FIG. 6 as a coil spring biasing respective deck plate segments 34a, 34b toward the closed position. The coil spring 50 is configured to have a predetermined spring force to urge each respective deck plate segment 34a, 34b toward a predetermined or initial position of zero clearance. The coil spring 50 has a first end connected to a pivot pin 72 of a respective deck plate and a second end operatively connected to a respective deck plate segment. Specifically, the second end of the spring includes a control pin 74, which is indirectly affixed to a respective deck plate segment. The coil spring 50 is housed within a housing 70. The pivot pin 72 has a bore end pivotally connected to a body portion of the deck plate 36a, 36b and a top end fixedly connected to the deck plate segment. So constructed, the coil spring 50 coheres to the pivot pin 72 such that when the pivot pin 72 is rotated to adjust the predetermined spring force, stress on the coil spring 50 is either increased or decreased. As a result, force is transferred to the opposite end of the coil spring 50 and the control pin 74. As the control pin 74 is indirectly affixed to the deck plate segment 34a, 34b, force is transferred from the coil spring 50 to the deck plate segment to urge each respective deck plate segment toward the predetermined position of zero clearance.

In other words, the coil spring 50 biases each of the respective deck plate segments 34a, 34b to permit movement of each deck plate segment between first and second positions when the deck plate segments encounter a separation force greater than the predetermined spring force generated by the coil spring 50. For example, the first position of the deck plate segments 34a, 34b corresponds to the predetermined position e.g., zero clearance. The second position of the deck plate segments 34a, 34b is shown e.g., in FIG. 4, wherein the deck plate segments open to allow the stalk 42 to pass through the gap 28 between the deck plates. In an aspect, each deck plate segment has a fixed range that allows for a predetermined maximum clearance opening that corresponds to the gap opening 28 defined by the position of the deck plates 36a, 36b.

Figure 7:
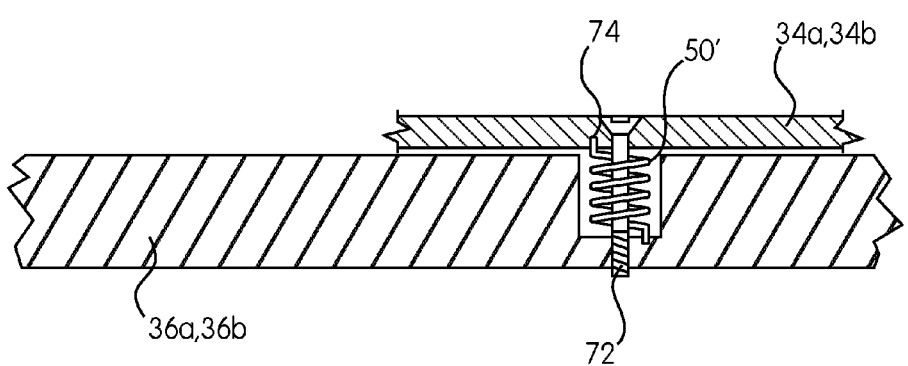
FIG. 7 is a partial simplified cross-sectional view of a biasing member of a deck plate assembly of the row unit of FIG. 2 in accordance with another aspect of the present invention.

FIG. 7 illustrates an alternate embodiment of the biasing member 50' applicable to the present invention. In this configuration, the housing 70 is omitted and instead built into a recessed deck plate. Further, when configured with a spring biasing member 50', the first end of the spring is attached to the deck plate and the second end attached to the deck plate segment. Alternatively, the amount the biasing member is recessed into the deck plate can be varied, thereby positioning deck plate segments attached to the deck plate at various heights or spacing.

Figure 8:
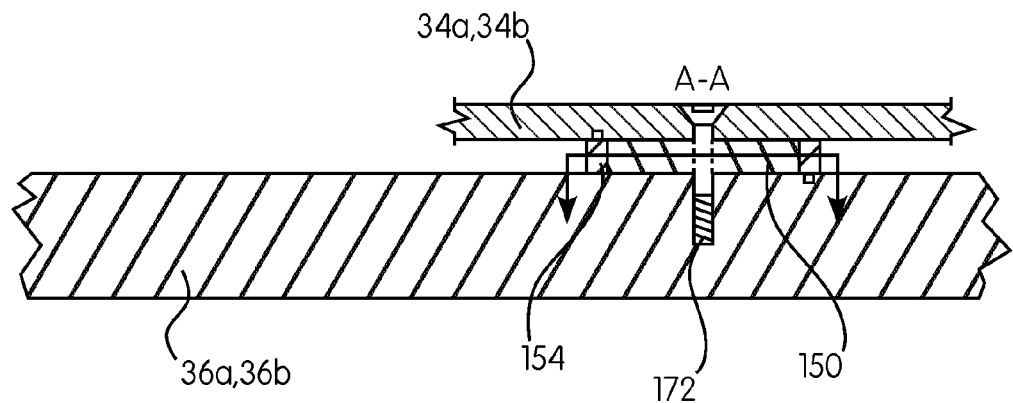
FIG. 8 is a partial simplified side cross-sectional view of a biasing member of a deck plate assembly of the row unit of FIG. 2 in accordance with yet another aspect of the present invention.
Figure 9:
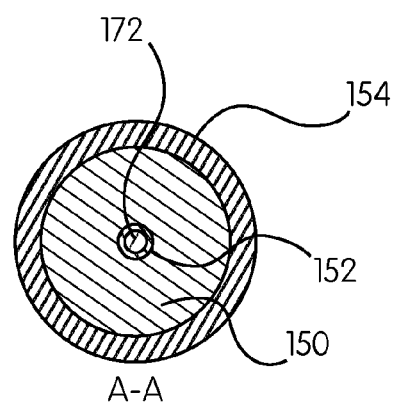
FIG. 9 is a cross-sectional view of the biasing member of FIG. 8 taken along section A-A with a bushing.

In an another aspect of the present invention, the biasing member 150 is configured as shaped and best shown in FIGS. 8 and 9 as an elastomeric member 150 biasing respective deck plate segments 34a, 34b toward the closed position in response to stalks biasing the respective deck plate segments 34a, 34b toward the retracted position. The biasing member 150 is configured to have a predetermined biasing force to urge each respective deck plate segment 34a, 34b toward a predetermined position of zero clearance. As shown in FIGS. 8 and 9, the elastomeric member 150 is mounted as a pivotal connection between the deck plate 36a, 36b and the deck plate segments 34a, 34b. Specifically, the elastomeric member 150 has a pivot pin 172 with a first end pivotably connected to a respective deck plate 36a, 36b and a second end rigidly connected to a respective deck plate segment 34a, 34b.

FIG. 9 shows a cross-sectional view of the elastomeric member 150 of FIG. 8 with an outer bushing 154 that surrounds the elastomeric member 150. Preferably, the elastomeric member 150 has a cylindrical or annular shape. While the foregoing elastomeric member 150 is preferably annular in shape, it can alternatively be configured with any other size and shape suitable for its intended purpose e.g., square, oval, rectangular, crescent and the like. In an aspect of the present invention, the elastomeric member 150 is configured to surround the pivot pin 172. Optionally, the elastomeric member 150 can include an inner bushing 152 around the pivot pin 172 and an outer bushing 154 that surrounds the elastomeric member 150. In this configuration, the elastomeric member 150 is fixedly attached to the bushing.

When assembled as shown in FIG. 8, the elastomeric member 150 is located between the respective deck plate segments 34a, 34b and the respective deck plates 36a, 36b. Therefore, loads applied to the deck plate segments 34a, 34b from stalks passing through the gap 28 are transferred to elastomeric member 150 before passing to the deck plates 36a, 36b of the deck plate assemblies 38a, 38b and the rest of the row unit 22. The elastomeric member 150 is preferably formed from an elastomeric material, such as urethanes, silicone rubber, natural rubber, or other elastomer having a hardness value sufficient for its intended purpose and performance characteristics. Primarily, the elastomer hardness is chosen to provide a small degree of give or play when subjected to the expected loads seen during harvesting use. The elastomer hardness must also exhibit sufficient strength to withstand repeated and long use and to urge the first deck plate segments 34a and the second deck plate segments 34b toward the closed position of zero clearance. Preferably, the elastomer for the elastomer member 150 has a Shore A hardness value of about 50-90 Durometer, more preferably about 65-75 Durometer, and most preferably about 70 Durometer.

As mentioned above, the biasing member 50 can also be configured and shaped as a clock spring. Such a clock spring is known in the art and a further detailed description of its structure, function and operation is not necessary for a complete understanding of the present invention. However, a clock spring applicable to the present invention is disclosed in U.S. Patent App. Pub. No. 2015/0208580, the entire disclosure of which is incorporated by reference herein for all purposes.

In sum, the present invention provides an improved multi-segmented deck plate auto adjustment mechanism for a harvester row unit. The row unit includes a first and a second deck plate assembly adjacently mounted on a frame of the row unit, wherein each deck plate assembly includes a deck plate, a plurality of deck plate segments extending from the deck plate, and a plurality of biasing members for biasing each respective deck plate segment. In operation, the deck plates are connected to a control arm for macro adjustment of the deck plates by the operator to a predetermined gap width. The plurality of deck plate segments and their respective biasing members provide automatic micro adjustment of the plurality of deck plate segments to accommodate multiple stalks of varying widths passing through the gap between the deck plates.

Advantageously, the present invention allows for the deck plate segments to be set to a zero clearance without excessive opening force. This allows the gap spacing between deck plates to remain closed except when a stalk is present. In contrast, conventional header designs can cause the gap spacing between the deck plates to remain open even when stalks are not present. Therefore, the zero clearance gap spacing between deck plates in the present invention reduces significant grain loss during harvesting operations. As such, the present invention can be used on rows that do not have active stalks passing through them. Therefore, the multi-segmented deck plate assembly of the present invention allows for harvesting in any direction and row unit spacing narrower than the planted row spacing can be used without losing grain. The multi-segmented deck plate assembly allows every segment to adjust perfectly for the diameter of each stalk. For example, when you have several plants per field, as the row spacing changes, the distance between the plants change. With conventional designs, if you had e.g., a 30" long deck plate and had 6 plants at one time, the deck plates would open to the longest diameter stalk. As a result, you would lose grain from smaller diameter stalks because they can be easily pulled through the gap in the deck plates and become lost.

The multiple segments allow for covering the gap between the deck plates, i.e., zero clearance. Therefore, where there is no stalk, the clearance opening between deck plate segments remains closed and reduces grain loss between plants. Anytime there is no plant, there is a potential for grain loss. For example, if you have multiple plants with 15", 30" and 40" row spacings, you could use a 15" header with multi-segmented deck plates that could harvest all of those row spacings without unnecessarily losing grain between deck plates having an open deck plate gap width. This provides additional operation and harvesting flexibility because you can utilize one header for multiple crops and plants in the direction in which crops are harvested.

Additionally, the tension of the biasing members can be further adjusted to allow for variations amongst different crops. For example, for plants with loosely attached ears, the biasing members can be set to a lower tension. For plants with strongly attached ears, the biasing members can be set to a higher tension. In other words, an operator can adjust the tension of the biasing members for segments in relation to the strength of attachment of an ear or crop material to a particular stalk. Furthermore, during harvesting operations, the gap between the deck plates can often become plugged with crop debris and needs to be cleaned out. The present invention allows the operator to easily spread the deck plate segments apart to efficiently clear the gap without having to move the entire deck plate assembly.

While the present invention has been described with reference to preferred embodiments, it will be appreciated by those skilled in the art that various changes may be made and equivalents may be substituted for elements thereof without departing from the scope of the present invention. In addition, modifications may be made to adapt a particular situation or material to the teachings of the present invention without departing from the essential scope thereof. It is to be understood, therefore, that the present invention not be limited to the particular aspects disclosed, but it is intended to cover modifications within the spirit and scope of the present invention as defined by the appended claims.

What is claimed is:

1. A row unit for a header of an agricultural harvester comprising:
   a frame;
   a first deck plate assembly mounted to the frame, the first deck plate assembly including:
      a first movable deck plate,
      a plurality of first deck plate segments extending from the first movable deck plate and moveable between a first position and a second position relative to the first movable deck plate, and
      a plurality of biasing members for biasing each respective first deck plate segment; and
   a second deck plate assembly mounted to the frame, the second deck plate assembly including:
      a second movable deck plate,
      a plurality of second deck plate segments extending from the second movable deck plate and moveable between a first position and a second position relative to the second movable deck plate, and
      a plurality of biasing members for biasing each respective second deck plate segment.

2. The row unit of claim 1, wherein the first deck plate assembly further comprises:
   a first elongated linkage;
   a first primary connection mechanism connecting the first movable deck plate and the first elongated linkage about a first end of the first movable deck plate; and
   a first secondary connection mechanism connecting the first movable deck plate and the first elongated linkage about a second end of the first movable deck plate.

3. The row unit of claim 2, wherein the second deck plate assembly further comprises:
   a second elongated linkage;
   a second primary connection mechanism connecting the second movable deck plate and the second elongated linkage about a first end of the second movable deck plate; and
   a second secondary connection mechanism connecting the second movable deck plate and the second elongated linkage about a second end of the second movable deck plate.

4. The row unit of claim 3, wherein each connection mechanism is a pivot mechanism connected to respective elongated linkages and deck plate assemblies, and pivotably connected to the row unit.

5. The row unit of claim 3, further comprising a control arm connected to the first and second elongated linkages for adjusting a width of a stalk receiving gap defined by the first and second deck plate assemblies.

6. The row unit of claim 1, wherein each of the plurality of first and second deck plate segments is a curved deck plate segment defining convex stalk engaging surfaces.

7. The row unit of claim 1, wherein each of the plurality of biasing members is a coil spring biasing a respective deck plate segment of the plurality of first and second deck plate segments for urging the respective deck plate segment into engagement with stalks of varying thicknesses.

8. The row unit of claim 7, wherein the coil spring has:
   a first end connected to a pivot pin of a respective movable deck plate; and
   a second end connected to the respective deck plate segment.

9. A row unit for a header of an agricultural harvester comprising:

a first deck plate assembly and a second deck plate assembly adjacently mounted on a frame, each deck plate assembly having:
  a deck plate,
  a plurality of deck plate segments mounted to the deck plate, and
  a plurality of biasing members for biasing the plurality of deck plate segments; and
a row divider extending forwardly from the frame.

10. The row unit of claim 9, wherein each of the plurality of biasing members is a torsion spring, a tension spring, a compression spring, an elastomeric member, or combination thereof.

11. The row unit of claim 9, wherein each of the plurality of deck plate segments has a tapered leading edge.

12. The row unit of claim 9, wherein each of the plurality of deck plate segments is a curved deck plate segment defining convex stalk engaging surfaces.

13. The row unit of claim 9, wherein each of the plurality of deck plate segments overlaps an adjacent deck plate segment.

14. The row unit of claim 9, wherein each of the plurality of biasing members is a coil spring biasing a respective deck plate segment of the plurality of deck plate segments for urging the respective deck plate segment into engagement with stalks of varying thicknesses.

15. The row unit of claim 14, wherein the coil spring has:
  a first end connected to a pivot pin of a respective deck plate; and
  a second end connected to the respective deck plate segment.

16. A deck plate assembly for an agricultural harvester comprising:
  a movable deck plate;
  a plurality of deck plate segments mounted to the movable deck plate and moveable between a first position and a second position relative to the movable deck plate, wherein each of the plurality of deck plate segments includes a substantially vertically extending pivot pin connecting the deck plate segment to the movable deck plate; and
  a plurality of biasing members, wherein each of the plurality of biasing members bias each respective deck plate segment about the pivot pin.

17. The deck plate assembly of claim 16, wherein each of the plurality of biasing members is housed within a recess of the movable deck plate.

18. The deck plate assembly of claim 16, wherein each of the plurality of deck plate segments is a curved deck plate segment defining convex stalk engaging surfaces, or overlaps an adjacent deck plate segment.

19. A row unit for a header of an agricultural harvester comprising:
  a frame;
  a plurality of deck plate segments mounted to the frame, each moveable in a direction substantially parallel to a top planar surface of the deck plate segment and movable between a first position and a second position relative to the frame;
  a plurality of biasing members for biasing each respective deck plate segment; and
  a row divider extending forwardly from the frame.

20. The row unit of claim 19, wherein each of the plurality of biasing members circumscribe a respective pivot pin connecting a respective deck plate segment of the plurality of deck plate segments to a deck plate.

* * * * *